United States Patent [19]

Sampson

[11] Patent Number: 4,898,555
[45] Date of Patent: Feb. 6, 1990

[54] DISPLAY SCREEN BEZEL AND ASSEMBLY METHOD

[75] Inventor: Craig F. Sampson, Palo Alto, Calif.

[73] Assignee: Bell & Howell Publication Systems Company, Skokie, Ill.

[21] Appl. No.: 327,741

[22] Filed: Mar. 23, 1989

[51] Int. Cl.[4] ............ H04N 7/14; H04N 5/64; G08C 21/00
[52] U.S. Cl. .................................. 445/22; 178/18; 340/712; 358/248
[58] Field of Search .................. 445/22; 178/18; 340/712; 358/247, 248, 249

[56] References Cited

U.S. PATENT DOCUMENTS

| | | | |
|---|---|---|---|
| 2,663,011 | 12/1953 | De Boy | 358/248 |
| 4,063,289 | 12/1977 | Veenendaal | 358/247 X |
| 4,572,592 | 2/1986 | Haven | 358/248 X |
| 4,675,569 | 6/1987 | Bowman et al. | 178/18 |

Primary Examiner—Kenneth J. Ramsey
Attorney, Agent, or Firm—David Weiss

[57] ABSTRACT

A self adjusting bezel assembly for a display screen, and specifically for an infrared radiation touch input display system, including a method for assemblying the bezel apparatus to the display screen. An outer bezel is mounted in fixed relation to the display device, and an inner bezel containing a radiation emitter and detector matrix is retained by and floats with respect to the outer bezel for being urged against the display screen in precise relation thereto.

42 Claims, 3 Drawing Sheets

Fig. 4.
Fig. 6.
Fig. 7.
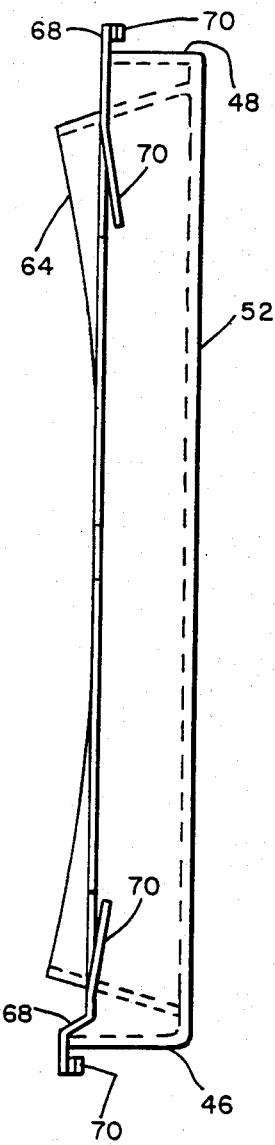
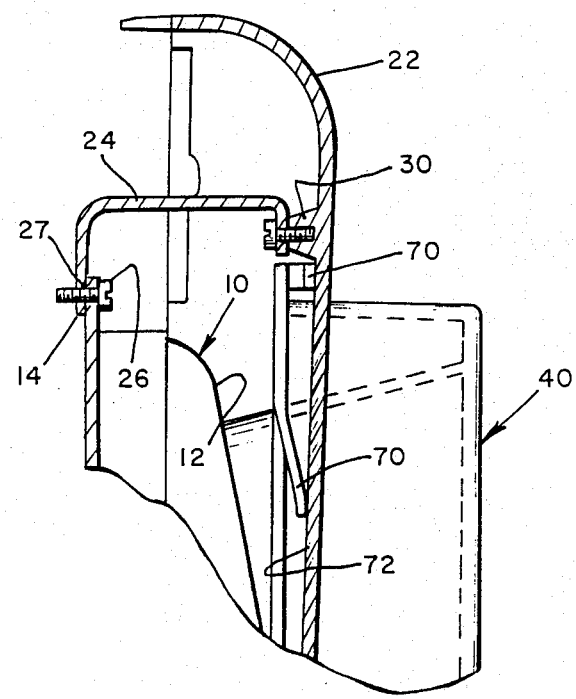
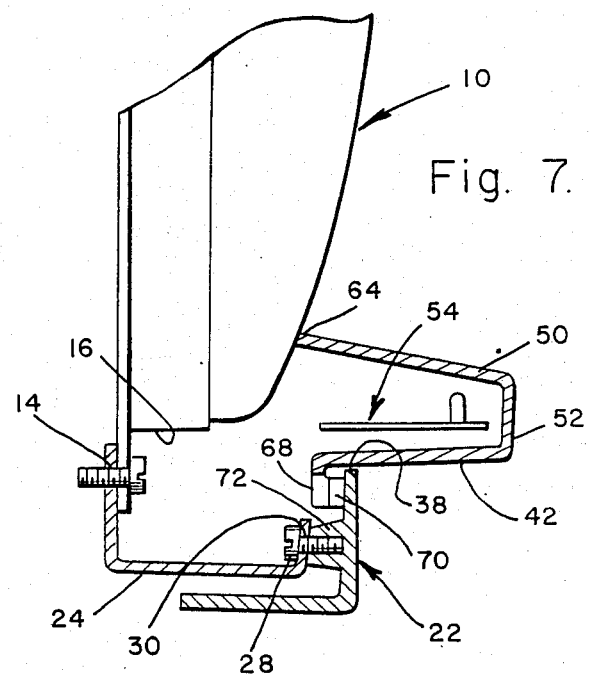

DISPLAY SCREEN BEZEL AND ASSEMBLY METHOD

CROSS-REFERENCE TO RELATED PATENT APPLICATION

Reference is made to related U.S. patent application Ser. No. 07/319,528, "Tilt and Swivel Support Apparatus" by Craig Sampson, filed Mar. 6, 1989.

BACKGROUND OF THE INVENTION

This invention relates to bezel apparatus for a display screen of a display device, and more particularly to a bezel containing an arrangement of radiation emitter and detector pairs for utilization in a touch input computer display system, and a method for assemblying the bezel apparatus to the display device.

One type of interactive computer system permits an operator to enter information into the computer by selectively touching points on the screen of a computer monitor or display device, such as a cathode ray tube (CRT), upon which is displayed relevant information. One such touch input system provides an arrangement of radiation emitter and detector pairs, for example a plurality of light emitters (typically in the infrared range) arranged along one vertical side and one horizontal side of the display screen, and a plurality of detectors arranged along the other vertical and horizontal sides. The resulting rectangular arrangement of emitter and detector pairs produces a corresponding light beam grid over the display screen which, when interrupted by the operator's finger or a pointer, permits the touched screen location to be calculated by the computer and data related to the information then displayed at the touched screen location to be entered into the computer.

One manner of supporting the arrangement of infrared emitters and detectors is to enclose the arrangement within a rectangular bezel bordering the display screen or CRT face, the bezel being of a material transparent to infrared radiation and often referred to as a touch screen bezel. The arrangement is fixed within the touch screen bezel such that the emitters and detectors are in predetermined spatial relation to the CRT face when the bezel is in predetermined position in relation to the CRT face. Accordingly, it may be appreciated that the accurate determination of the location of each point touched on the CRT face depends in part upon the accuracy with which the touch screen bezel is positioned upon the CRT face. The mounting of the CRT and the touch screen bezel to the assembly's chassis for producing such accurate positioning, however, is somewhat hampered by the fact that the face of a typical CRT may not have been accurately positioned relative to its mounting points when the CRT was manufactured.

A touch screen bezel is normally mounted to the display system chassis in fixed position determined by the requirement that the bezel be precisely aligned with other housing parts attached to the chassis. When the CRT is mounted to the chassis, the position of the CRT face may be skewed or orthogonally displaced with respect to the precisely fixed touch screen bezel. This problem is typically overcome by adjusting the position of the CRT in the chassis, usually employing a fixture for implementing such adjustments, with the expectation that the bezel will properly seat against the CRT face when the bezel is mounted to the chassis in its fixed position after CRT position adjustments have been completed. Such mounting adjustments require utilization of additional parts and assembly time, and are subject to error resulting in inaccuracies in the seating of the touch screen bezel to the CRT face.

SUMMARY OF THE INVENTION

The present invention provides a touch screen bezel assembly which is mounted to a chassis or frame to which a CRT is also mounted, the bezel assembly being fixed in precise relation to other housing parts while being self adjusting to the face of the CRT, eliminating the need for making mounting adjustments to the CRT with respect to the chassis.

Briefly described, the present invention provides bezel apparatus for a display device having a display screen, comprising in combination: a first bezel for the display screen, the first bezel having inner edges describing an opening in the first bezel; mounting means for mounting the first bezel in fixed relation to the display device; a second bezel for being fitted within the first bezel opening, the second bezel having an inner lip with an edge describing an opening in the second bezel, the edge conforming to the contour of the display screen for engaging the display screen; and spring means for cooperating with the first and second bezels for resiliently retaining the second bezel within the first bezel with the second bezel's inner lip edge engaging the display screen when the first bezel is mounted in fixed relation to the display device with the second bezel fitted within the first bezel opening. The first bezel opening is preferably generally rectangular and, when the first bezel is mounted in fixed relation to the display device, the edges describing the first bezel opening border the display screen. The second bezel is preferably also generally rectangular and, when the first bezel is mounted to the display device with the second bezel fitted within the first bezel opening, the spring means urges the second bezel's inner lip edge to engage or seat against the display screen.

The spring means between the inner and outer bezels permits the inner bezel to float with respect to the fixed outer bezel, along an axis perpendicular to the display screen, while the inner bezel's conforming inner lip edge is urged to seat against the CRT face. The inner bezel, which when used in a touch input display system contains a rectangular arrangement of radiation emitter and detector pairs in precise spatial arrangement within the inner bezel for providing a radiation grid in front of the display screen, is accordingly self positioning upon the CRT face, accommodating manufacturing variations between the mounting points and the face of the CRT. In addition, the biasing force produced by the spring means when contacting the outer bezel causes the inner bezel's conforming inner lip edge to be closely maintained against the CRT face, serving to protect the operating components within the inner bezel from dust and other ambient contaminants. In the preferred embodiment of the present invention, the spring means includes two spaced spring devices carried by each side of the generally rectangular inner bezel.

According to the present invention, the method for assembling the bezel apparatus to the display device or CRT comprises the steps of: providing a display device having a display screen; providing a chassis for mounting the display device thereto; mounting the display device to the chassis; providing a first bezel for the display screen, the first bezel having inner edges describing an opening in the first bezel; providing a second bezel for being fitted within the first bezel opening, the second bezel having an inner lip with an edge describing an opening in the second bezel, the inner lip edge conforming to the contour of the display screen for engaging the display screen, the second bezel including spring means carried thereby; fitting the second bezel within the first bezel opening for being retained by the first bezel and with the spring means directed for resiliently engaging the first bezel; and mounting the first bezel to the chassis with the second bezel fitted within the first bezel opening, the second bezel inner lip edge engaging the display screen and the spring means resiliently engaging the first bezel. When the bezel apparatus is used in a touch input display system, radiation emitters and detectors, together with associated circuitry, are placed in precisely positioned rectangular arrangement within the radiation-transparent second or inner bezel, prior to the step of fitting the second bezel within the first bezel opening.

BRIEF DESCRIPTION OF THE DRAWINGS

The novel features which are believed to be characteristic of the invention, together with further advantages thereof, will be better understood from the following description considered in connection with the accompanying drawings in which a preferred embodiment and the method of the invention are illustrated by way of example. It is to be expressly understood, however, that the drawings are for the purpose of illustration and description only and are not intended as a definition of the limits of the invention.

FIG. 4 is a side elevation view of the inner bezel of FIG. 3;

FIG. 6 is a fragmentary cross-sectional view of the bezel/CRT assembly of FIG. 1 taken along the line 6—6 in the direction of the appended arrows; and FIG. 7 is a fragmentary cross-sectional view of the bezel/CRT assembly of FIG. 1 taken along the line 7—7 in the direction of the appended arrows.

DETAILED DESCRIPTION OF THE PREFERRED EMBODIMENT

Figure 1:
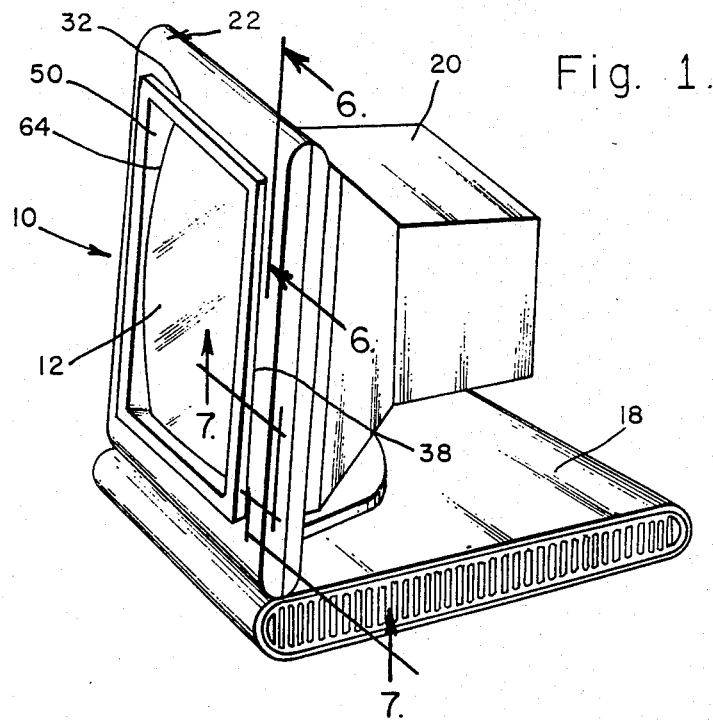
FIG. 1 is a perspective view of a CRT display in combination with bezel apparatus according to a preferred embodiment of the present invention.
Figure 2:
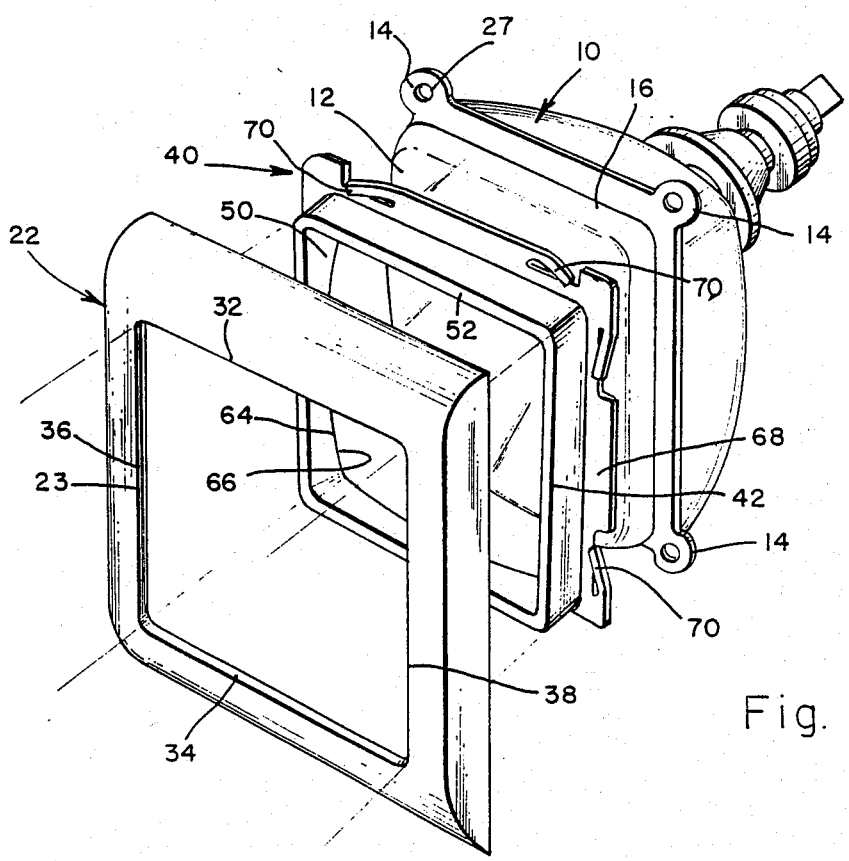
FIG. 2 is an exploded perspective view of the CRT and bezel assembly of the preferred embodiment of the present invention.

Turning first to FIGS. 1 and 2, there is shown a cathode ray tube display device or CRT 10 having a display screen or CRT face 12. The CRT 10 is mounted to a frame or chassis (a relevant portion of which is indicated as reference numeral 24 in FIGS. 6 and 7) by means of mounting ears 14 projecting from a mounting collar 16 secured to the CRT 10, the ears 14 being situated at each corner of the CRT face 12 and utilized for bolting the CRT 10 to the chassis in conventional manner. The chassis is attached to a support base 18, which may house microprocessor circuitry for a computer work station of which the CRT 10 is the information display device or monitor. The base 18 is typically placed upon a suitable horizontal surface such as a desk or countertop, for supporting the CRT 10 with the width dimension of the CRT face 12 horizontally extending. A housing 20 is also mounted to the chassis, for enclosing the chassis and the CRT 10 with the exception of the CRT face 12 which is bordered by the bezel arrangement of the present invention as hereinafter described. One type of chassis and one manner of its attachment to the base 18 is described in the previously referenced U.S. patent application entitled "Tilt and Swivel Support Apparatus" by Craig Sampson, the present inventor.

As best shown in FIG. 2, a first bezel 22 has a generally rectangular opening 23. As shown in FIGS. 6 and 7, the first bezel 22 is mounted to the chassis 24 and, therefore, to the CRT 10. As previously noted, the CRT 10 is mounted to the chassis 24 by bolts 26 extending through apertures 27 in the CRT ears 14 and threadably engaging the chassis 24, while the first bezel 22 is mounted to the chassis 24 by means of screws 28 extending through apertures 30 in the chassis 24 and threadably engaging the first bezel 22. When the CRT 10 and the first bezel 22 are mounted to the chassis, the top and bottom side edges 32, 34 describing the first bezel opening 23 extend along the horizontal or width dimension of the CRT face 12, and the left and right side edges 36, 38 of the first bezel opening 24 extend along the vertical or height dimension of the CRT face 12, with the edges 32, 34, 36, 38 of the first bezel opening 23 bordering the CRT face 12.

As may best be seen in FIGS. 2 and 7, a generally rectangular second bezel 40 includes outer sides 42, 44, 46, 48 and an inner lip 50 interiorly circumjacent the outer sides 42, 44, 46, 48, bridged by a generally rectangular front rim 52, providing a cavity 54 extending within the second bezel 40.

Figure 3:
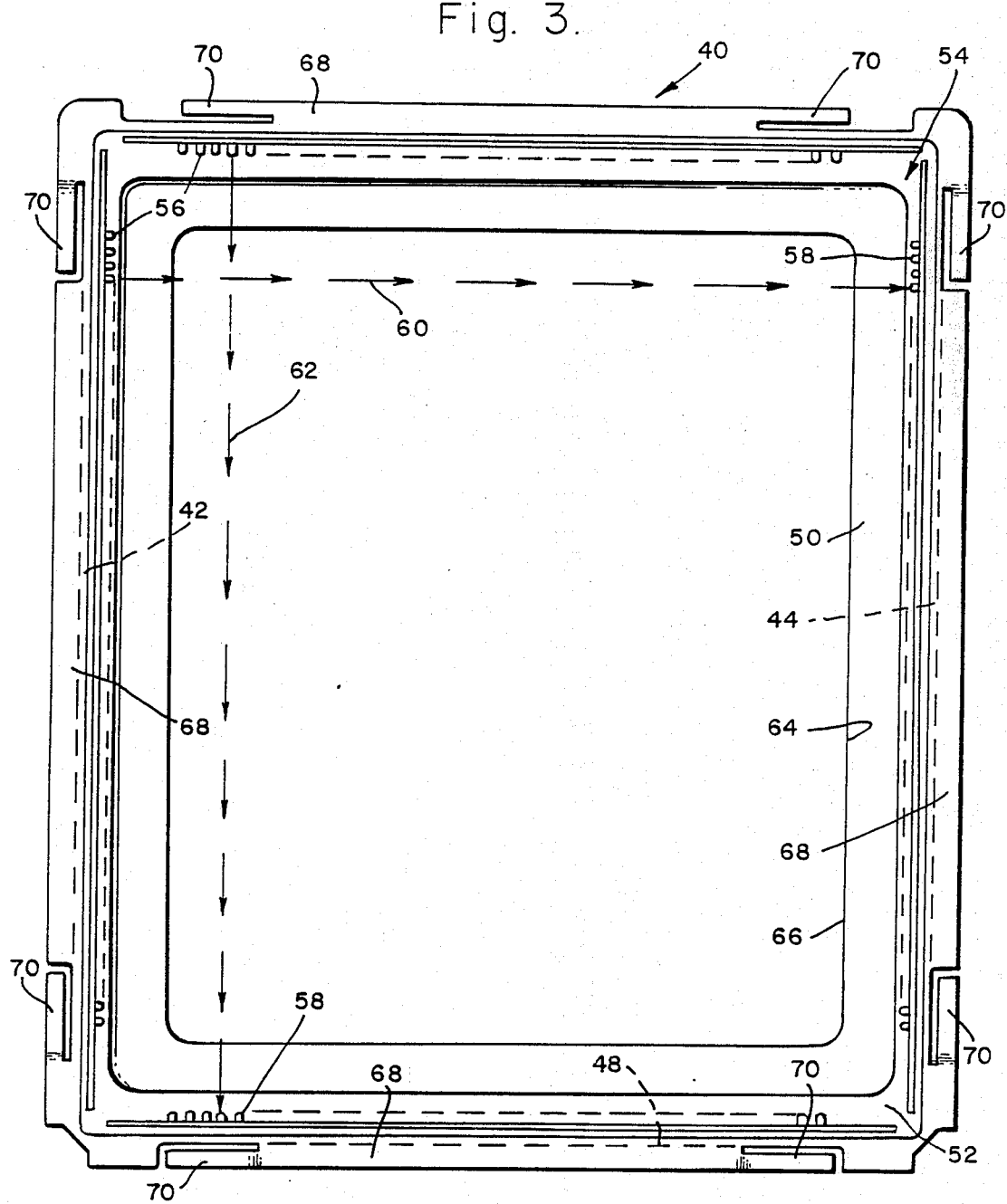
FIG. 3 is a rear elevation view of a preferred embodiment of the inner bezel according to the present invention, with an arrangement of radiation emitter and detector pairs diagrammatically indicated as being contained therein.
Figure 5:
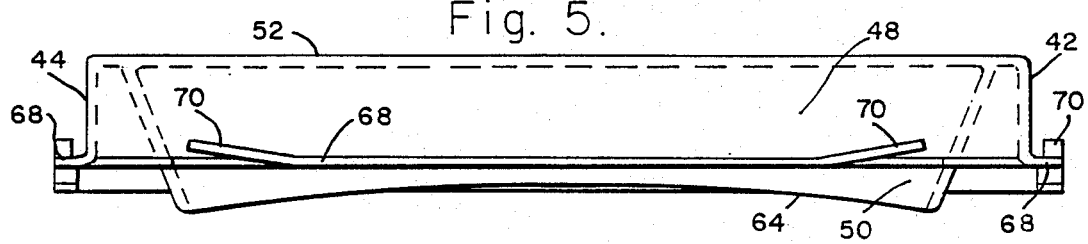
FIG. 5 is a bottom plan view of the inner bezel of FIG. 3.

Referring to FIG. 3, a first plurality of infrared radiation emitters 56 (e.g. light emitting diodes) are arranged within the cavity 54 along one side of the second bezel 40 (e.g. the left-hand side 42 as viewed in FIG. 3), and a corresponding plurality of infrared radiation detectors 58 are arranged in the cavity 54 along the opposing side (e.g. the right-hand side 44 as viewed in FIG. 3). Similarly, a second plurality of infrared radiation emitters 56 are arranged within the cavity 54 along one of the other sides of the second bezel 40 (e.g. the top side 45 as viewed in FIG. 3) and a corresponding plurality of infrared radiation detectors 58 are arranged in the cavity 54 along the opposing side (e.g. the bottom side 48 as viewed in FIG. 3). Also included within the cavity 54 of the second bezel 40 are the circuits and mounting devices associated with the emitters 56 and the detectors 58, and each detector 58 is paired with an opposing emitter 56 to form a rectangular arrangement of emitter/detector pairs 56, 58 for producing a grid of infrared light beams illustrated, by way of example, by light beam 60 extending along the horizontal or width dimension of the second bezel 40 and beam light 62 extending along the vertical or height dimension of the second bezel 10. Infrared emitters and detectors and their circuitry for producing an optical grid for infrared touch input computer monitor applications are well known in the touch input computer system art. The second bezel 40 is manufactured of a material which is transparent to infrared light (e.g. a polycarbonate marketed by General Electric Company under the trademark Lexan and containing an infrared-transparent pigment such as General Electric 61076.

The inner lip 50 of the second bezel 40 is preferably obliquely extending rearwardly (i.e. toward the left as viewed in FIGS. 6 and 7) and inwardly, terminating wit an edge 64 describing a generally rectangular opening 66 which conforms to the contour of the CRT face 12, for engaging the CRT face 12 when the second bezel 40 is retained by the first bezel 22 in accordance of the present invention.

The dimensions of the outer bezel 40 are such that its outer sides 42, 44, 46, 48 fit within the opening 23 of the first bezel 22 with only a small space (perhaps 0.02 inch) between the second bezel outer sides 42, 44, 46, 48 and the respective inner edges 38, 36, 32, 34 of the first bezel 22. A flange 68 outwardly extends from the rear of the second bezel 40 (i.e. the rear being toward the right as viewed in FIG. 4), along the base of each of the second bezel outer sides 42, 44, 46, 48. The width of each flange 68 is such that the overall height and width dimensions of the second bezel 40 are greater than the opening 23 of the first bezel 22, so that the second bezel flanges 68 extend behind the first bezel 22 when the second bezel 40 is inserted within the opening 23 of the first bezel 22 as shown in FIG. 7.

Each of the outer sides 42, 44, 46, 48 of the second bezel 40 carry at least one and preferably two spring devices, which in their preferred embodiment are resilient cantilever members or spring fingers 70 obliquely projecting from the flanges 68 along each side 42, 44, 46, 48 and toward the front of the second bezel 40 (i.e. toward the left as viewed in FIG. 4). The spring fingers 70 are preferably integral with the second bezel 40, being molded into the flanges 68, and are preferably situated near the respective ends of each of the sides 42, 44, 46, 48. The length and forward projection of each of the spring fingers 70 are sufficient such that the spring fingers 70 resiliently engage the rear surface 72 of the first bezel 22 (which may include a member affixed to the rear surface 72) when, as shown in FIGS. 6 and 7, the second bezel 40 is fitted within the first bezel 22 and the first bezel 22 is mounted in fixed relation to the CRT 10 with the second bezel's inner lip edge 64 engaging the CRT face 12.

In practicing the method of assembling the bezel apparatus of the present invention to the CRT face 12, the infrared emitter and detector pairs 56, 58 and their associated circuits are mounted within the cavity 54 of the second bezel 40, if the apparatus is for utilization in a touch input display system for providing an infrared radiation grid in front of the CRT face 12. The second bezel 40 is then fitted within the opening 23 of the first bezel 22 with the spring fingers 70 directed for resiliently engaging the rear surface 72 of the first bezel 22. The first or outer bezel 22 is next mounted to the chassis upon which has been mounted the CRT 10, with the second bezel's inner lip edge 64 engaging the CRT face 12. As the first or outer bezel 22 is secured to the chassis by the screws 28 (see FIGS. 6 and 7) the rearward displacement of the outer bezel 22 with its rear surface 72 engaging the spring fingers 70 rearwardly urges the inner bezel 40 for causing its inner lip edge 64 to engage the CRT face 12. The consequent resilient deflection of the spring fingers 70 effectively causes the inner bezel 40 to float with respect to the outer bezel 22 and to be self positioning in predetermined relation with respect to the CRT face 12. In such manner, manufacturing variations between the mounting points (e.g. the mounting ears 14) of the CRT 10 and the CRT face 12 are accommodated. In addition, the continuing biasing force exerted by the spring fingers 70 when contacting the outer bezel 22 causes the inner lip edge 64 of the inner bezel 40 to be closely maintained against the CRT face 12, assisting in precluding dust and other ambient contaminants from entering the cavity 54 and from reaching the infrared emitters 56 and detectors 58 and their associated circuits.

Thus there has been described a bezel arrangement for an infrared radiation touch input display system, along with the method for assemblying the bezel apparatus to the system's display screen, wherein the bezel assembly is mounted in predetermined fixed relation to the display housing and is self adjusting upon the display screen for accommodating manufacturing variations and inaccuracies in the position of the display screen with respect to the mounting points of the display device. Although the preferred embodiment has been described with respect to its utilization in a touch input system, the invention may be utilized in other display systems which are not of the touch input type, in which case the arrangement of radiation emitter and detector pairs are not contained by the inner bezel. Other embodiments of the present invention and modifications of the embodiment and method herein presented may be developed without departing from the essential characteristics thereof. Accordingly, the invention should be limited only by the scope of the claims listed below.

I claim:

1. Bezel apparatus for a display device having a display screen, comprising in combination:
    a first bezel for the display screen, said first bezel having inner edges describing an opening in said first bezel;
    mounting means for mounting said first bezel in fixed relation to the display device;
    a second bezel for being fitted within said first bezel opening, said second bezel having an inner lip with an edge describing an opening in said second bezel, said inner lip edge conforming to the contour of the display screen for engaging the display screen; and
    spring means for cooperating with said first and second bezels for resiliently retaining said second bezel within said first bezel with said second bezel's inner lip edge engaging the display screen when said first bezel is mounted in fixed relation to the display device with said second bezel fitted within said first bezel opening.

2. The apparatus according to claim 1, above, wherein said second bezel floats with respect to said first bezel for engaging the display screen when said first bezel is mounted in said fixed relation to the display device with said second bezel fitted within said first bezel opening.

3. The apparatus according to claim 1, above, wherein:
    said first bezel opening is generally rectangular and, when said first bezel is mounted in said fixed relation to the display device, said edges describing said first bezel opening border the display screen; and
    said second bezel is generally rectangular and, when said first bezel is mounted in said fixed relation to the display device with said second bezel fitted within said first bezel opening, said spring means urges said second bezel's inner lip edge to engage said display screen.

4. The apparatus according to claim 1, above, wherein said spring means is carried by said second bezel.

5. The apparatus according to claim 3, above, wherein said spring means includes at least one spring device carried by each side of said second bezel.

6. The apparatus according claim 3, above, wherein said spring means includes at least one spring device integral with each side of said second bezel.

7. The apparatus according to claim 3, above, wherein said spring means includes two spaced spring devices carried by each side of said second bezel.

8. The apparatus according to claim 3, above, wherein said spring means includes two spaced spring devices integral with each side of said second bezel.

9. The apparatus according to claim 8, above, wherein each of said spring devices include a spring finger obliquely projecting from a side of said second bezel toward said first bezel for resiliently engaging said first bezel when said first bezel is mounted in said fixed relation to the display device with said second bezel fitted within said first bezel opening.

10. The apparatus according to claim 9, above, wherein each of said sides include an outwardly extending flange therealong and said spring fingers obliquely project from said flanges.

11. The apparatus according to claim 1, 2, 3, 4, 5, 6, 7, 8, 9 or 10, above, for utilization in a touch input display system, wherein said second bezel contains an arrangement of radiation emitter and detector pairs for providing a radiation grid in front of the display screen when said first bezel is mounted in said fixed relation to the display device with said second bezel fitted within said first bezel opening.

12. Bezel and display apparatus, comprising in combination:
 a display device having a display screen;
 a first bezel for said display screen, said first bezel having inner edges describing an opening;
 mounting means mounting said first bezel in fixed relation to said display device;
 a second bezel fitted within said first bezel opening, said second bezel having an inner lip with an edge describing an opening in said second bezel, said inner lip edge conforming to the contour of said display screen; and
 spring means cooperating with said first and second bezels for resiliently retaining said second bezel within said first bezel with said second bezel's inner lip edge engaging said display screen.

13. The apparatus according to claim 12, above, wherein said second bezel floats with respect to said first bezel for engaging said display screen 14. The apparatus according to claim 12, above, wherein:
 said first bezel opening is generally rectangular and said first bezel is mounted with said edges describing said first bezel opening bordering said display screen; and
 said second bezel is generally rectangular and said spring means urges said second bezel inner lip edge to engage said display screen.

15. The apparatus according to claim 12, above, wherein said spring means is carried by said second bezel.

16. The apparatus according to claim 14, above, wherein said spring means includes at least one spring device carried by each side of said second bezel.

17. The apparatus according to claim 14, above, wherein said spring means includes at least one spring device integral with each side of said second bezel.

18. The apparatus according to claim 14, above, wherein said spring means includes two spaced spring devices carried by each side of said second bezel.

19. The apparatus according to claim 14, above wherein said spring means includes two spaced spring devices integral with each side of said second bezel.

20. The apparatus according to claim 19, above, wherein each of said spring devices include a spring finger obliquely projecting from a side of said second bezel and resiliently engaging said first bezel.

21. The apparatus according to claim 20, above, wherein each of said sides include an outwardly extending flange therealong and said spring fingers obliquely project from said flanges.

22. Bezel and display apparatus, comprising in combination:
 a chassis;
 a display device having a display screen, said display device mounted to said chassis;
 a first bezel for said display screen, said first bezel having inner edges describing an opening, said first bezel mounted to said chassis;
 a second bezel fitted within said first bezel opening, said second bezel having an inner lip with an edge describing an opening in said second bezel, said inner lip edge conforming to the contour of said display screen; and
 spring means cooperating with said first and second bezels for resiliently retaining said second bezel within said first bezel with said second bezel's inner lip edge engaging said display screen.

23. The apparatus according to claim 22, above, wherein said second bezel floats with respect to said first bezel for engaging said display screen 24. The apparatus according to claim 22, above, wherein
 said first bezel opening is generally rectangular and said first bezel is mounted to said chassis with said edges describing said first bezel opening bordering said display screen; and
 said second bezel is generally rectangular and said spring means urges said second bezel inner lip edge to engage said display screen.

25. The apparatus according to claim 22, above, wherein said spring means is carried by said second bezel.

26. The apparatus according to claim 24, above, wherein said spring means includes at least one spring device carried by each slide of said second bezel.

27. The apparatus according to claim 24, above, wherein said resilient means includes at least one spring device integral with each side of said second bezel.

28. The apparatus according to claim 24, above, wherein said spring means includes two spaced spring devices carried by each side of said second bezel.

29. The apparatus according to claim 24, above, wherein said spring means includes two spaced spring devices integral with each side of said second bezel.

30. The apparatus according to claim 29, above, wherein each of said spring devices include a spring finger obliquely projecting from a side of said second bezel and resiliently engaging said first bezel.

31. The apparatus according to claim 30, above, wherein each of said sides include an outwardly extending flange therealong and said spring fingers obliquely project from said flanges.

32. The apparatus according to claim 12, 13, 14, 15, 16, 17, 18, 19, 20, 21, 22, 23, 24, 25, 26, 27, 28, 29, 30 or 31, above, for utilization in a touch input display system, wherein said second bezel contains an arrangement of radiation emitter and detector pairs for providing a radiation grid in front of said display screen.

33. A method for assemblying a bezel to a display screen of a display device, comprising the steps of:
providing a display device having a display screen;
providing a chassis for mounting said display device thereto;
mounting said display device to said chassis;
providing a first bezel for the display screen, said first bezel having inner edges describing an opening in said first bezel;
providing a second bezel for being fitted within said first bezel opening, said second bezel having an inner lip with an edge describing an opening in said bezel, said inner lip edge conforming to the contour of said display screen for engaging said display screen, said second bezel including spring means carried thereby;
fitting said second bezel within said first bezel opening for being retained by said first bezel and with said spring means ,directed for resiliently engaging said first bezel; and
mounting said first bezel to said chassis with said second bezel fitted within said first bezel opening, and said second bezel's inner lip edge engaging said display screen and said spring means engaging said first bezel.

34. The method according to claim 33, above, wherein during the last step said second bezel floats with respect to said first bezel for engaging said display screen.

35. The method according to claim 33, above, wherein said opening of said first bezel is generally rectangular and said second bezel is generally rectangular, and during the last step said first bezel is mounted to said chassis with said edges describing said first bezel opening bordering said display screen.

36. The method according to claim 35, above, wherein said spring means includes at least one spring device carried by each side of said second bezel.

37. The method according to claim 35, above, wherein said spring means includes at least one spring device integral with each side of said second bezel.

38. The method according to claim 35, above, wherein said spring means includes two spaced spring devices carried by each side of said second bezel.

39. The method according to claim 35, above, wherein said spring means includes two spaced spring devices integral with each side of said second bezel.

40. The method according to claim 39, above, wherein each of said spring devices include a spring finger obliquely projecting from a side of said second bezel toward said first bezel and resiliently engaging said first bezel.

41. The method according to claim 40, above, wherein said sides include respective outwardly extending flanges therealong and said spring fingers project from said flanges.

42. The method according to claim 33, 34, 35, 36, 37, 38, 39, 40 or 41, above, further including the step of mounting an arrangement of radiation emitter and detector pairs and circuitry therefor within said second bezel, prior to the step of fitting said second bezel within said first bezel opening, for providing a radiation grid in front of said display screen.

* * * * *